(12) United States Patent
Harris et al.

(10) Patent No.: US 10,992,383 B2
(45) Date of Patent: Apr. 27, 2021

(54) AD HOC LIGHT-BASED MESH NETWORK

(71) Applicant: Accenture Global Solutions Limited, Dublin (IE)

(72) Inventors: Ian Harris, Dublin (IE); Salma Abdulaziz, Dun Laoghaire (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/383,869

(22) Filed: Apr. 15, 2019

(65) Prior Publication Data

US 2019/0319705 A1 Oct. 17, 2019

Related U.S. Application Data

(60) Provisional application No. 62/658,033, filed on Apr. 16, 2018.

(51) Int. Cl.
*H04B 10/116* (2013.01)
*H04B 10/114* (2013.01)
(Continued)

(52) U.S. Cl.
CPC ....... *H04B 10/116* (2013.01); *H04B 10/1149* (2013.01); *H04B 10/502* (2013.01); *H04W 40/246* (2013.01); *H04W 84/18* (2013.01)

(58) Field of Classification Search
CPC ............ H04B 10/1129; H04B 10/1149; H04B 10/116; H04B 10/502; H04W 40/246; H04W 40/248; H04W 40/30; H04W 84/18
(Continued)

(56) References Cited

U.S. PATENT DOCUMENTS 8,452,176 B2 * 5/2013 Doverspike ......... H04J 14/0267
398/57
8,565,598 B2 * 10/2013 Gerstel ............... H04J 14/0257
398/57
(Continued)

FOREIGN PATENT DOCUMENTS

| CN | 106612231 | 5/2017 |
| GB | 2423891 | 9/2006 |

OTHER PUBLICATIONS

Ramadhani et al ; The Technology of Li-Fi: A brief introduction; IOP Conf. Series: Materials Science and Engineering; 2018. (Year: 2018).*

(Continued)

*Primary Examiner* — Amritbir K Sandhu
(74) *Attorney, Agent, or Firm* — Fish & Richardson P.C.

(57) ABSTRACT

Techniques are described for providing an ad hoc mesh network of nodes that employ a light-based transmission protocol, such as a version of light fidelity (LiFi). The mesh network includes multiple nodes that each includes transceiver(s) for sending and receiving light-based communications. A node in the mesh network can receive a message signal sent by another node, by detecting the light modulations emitted by the sending node to transmit the message signal. The receiving node can forward the message signal to other node(s) that are proximal to the receiving node (e.g., that are in line-of-sight with the receiving node), by emitting the appropriate light modulations to send the message signal. In this way, a message signal can be conveyed from one node to another, from one endpoint of the mesh network to another endpoint of the mesh network.

20 Claims, 7 Drawing Sheets

(51) Int. Cl.
*H04B 10/50* (2013.01)
*H04W 40/24* (2009.01)
*H04W 84/18* (2009.01)

(58) Field of Classification Search
USPC .................................................. 398/140, 172
See application file for complete search history.

(56) References Cited

U.S. PATENT DOCUMENTS

| | | | | |
|---|---|---|---|---|
| 9,876,770 | B1* | 1/2018 | Ekambaram | H04W 12/08 |
| 10,505,631 | B1* | 12/2019 | Sundar Pal | B64D 11/0015 |
| 10,708,361 | B2* | 7/2020 | Abdul Latheef | H04L 67/12 |
| 10,727,941 | B1* | 7/2020 | Kanagarajan | G08G 5/0026 |
| 2007/0212067 | A1* | 9/2007 | Miyazaki | H04J 14/0227 |
| | | | | 398/57 |
| 2007/0212068 | A1* | 9/2007 | Miyazaki | H04J 14/0283 |
| | | | | 398/57 |
| 2008/0175197 | A1* | 7/2008 | Shao | H04W 72/02 |
| | | | | 370/329 |
| 2008/0186907 | A1* | 8/2008 | Yagyuu | H04W 40/30 |
| | | | | 370/328 |
| 2014/0133355 | A1* | 5/2014 | Shu | H04W 48/16 |
| | | | | 370/254 |
| 2015/0147067 | A1* | 5/2015 | Ryan | H04W 4/02 |
| | | | | 398/118 |
| 2015/0358079 | A1* | 12/2015 | Cronin | H04B 10/116 |
| | | | | 398/118 |
| 2016/0094398 | A1* | 3/2016 | Choudhury | H04L 45/42 |
| | | | | 370/254 |
| 2016/0197675 | A1* | 7/2016 | Ganick | H04N 5/2353 |
| | | | | 398/172 |
| 2017/0171949 | A1* | 6/2017 | Kim | H05B 47/11 |
| 2017/0206721 | A1 | 7/2017 | Koo | |
| 2017/0339561 | A1* | 11/2017 | Wennemyr | H04W 12/02 |
| 2017/0351946 | A1* | 12/2017 | Jayawardena | G06K 19/0728 |
| 2018/0159354 | A1* | 6/2018 | Garcia-Marquez | H01L 35/00 |
| 2018/0359374 | A1* | 12/2018 | Latheef | G06F 3/0488 |
| 2018/0359640 | A1* | 12/2018 | Perrufel | H04W 12/084 |
| 2019/0007143 | A1* | 1/2019 | Soto | H04B 10/588 |
| 2019/0052638 | A1* | 2/2019 | Agarwal | G07C 3/00 |
| 2020/0042006 | A1* | 2/2020 | Jessen | G06T 11/00 |
| 2020/0245168 | A1* | 7/2020 | Ketonen | H04L 43/045 |
| 2020/0322826 | A1* | 10/2020 | Wangler | H04L 41/5009 |

OTHER PUBLICATIONS

Ramadhani et al; The technology of LiFi: A Brief Introduction; 2018; IOP Conference Series: Materials Science and Engineering; pp. 1-11. (Year: 2018).*
European Search Report in European Application No. EP19169317, dated Aug. 22, 2019, 8 pages.
Sun et al., "Wireless multi-hop Ad hoc networks based on OSLR for underground coal mine", Wireless Communications and Signal Processing, Oct. 21, 2010, pp. 1-6.

* cited by examiner

US 10,992,383 B2

AD HOC LIGHT-BASED MESH NETWORK

CROSS-REFERENCE TO RELATED APPLICATIONS

This application claims the benefit of U.S. Provisional Patent Application No. 62/658,033 filed on Apr. 16, 2018 and entitled "AD HOC LIGHT-BASED MESH NETWORK," which is incorporated herein by reference in its entirety.

BACKGROUND

Wired or wireless networks are commonly used in a variety of environments to provide network communications between computing devices and/or access to other networks. In many instances, the use of a wired network or a wireless network that employs radio frequency signals is not viable, cost prohibitive, or otherwise not practical. For example, a wireless network that employs radio frequency signals (e.g., WiFi) may not be practical in an environment that includes obstructions that are opaque to radio-frequency signals. As another example, a wireless network that employs radio frequency signals may not be desirable in an environment with devices whose function would be impaired in the presence of radio frequency signals.

SUMMARY

Implementations of the present disclosure are generally directed to a mesh network that employs a light-based transmission protocol. More specifically, implementations are directed to a mesh network of nodes that communicate with one another using a light-based transmission protocol such as a version of light fidelity (LiFi), the mesh network being ad hoc and including mechanisms for discovery of nodes and optimization of message routing between nodes.

In general, innovative aspects of the subject matter described in this specification can be embodied in methods that includes operations of: receiving, at a respective node of a plurality of nodes that each includes at least one light fidelity (LiFi) transceiver, one or more LiFi discovery signals, each LiFi discovery signal sent from a respective proximal node and conveying a node identifier (ID) of the respective proximal node; in response to receiving the one or more LiFi discovery signals, storing proximal node data that includes the respective node ID of each of the one or more proximal nodes to indicate that the one or more proximal nodes are available for LiFi communication with the respective node; and receiving a LiFi message signal at the respective node and, in response, determining at least one of the one or more proximal nodes indicated in the proximal node data to re-transmit the LiFi message signal to, and re-transmitting the LiFi message signal to forward the LiFi message signal to the at least one of the one or more proximal nodes indicated in the proximal node data.

Implementations can optionally include one or more of the following features: the plurality of nodes includes at least one light emitting diode (LED) bulb; the proximal node data is stored locally on the respective node; the operations further include periodically updating the proximal node data based on subsequent receiving of LiFi discovery signals; periodically updating the proximal node data includes one or more of adding at least one node to the one or more proximal nodes and removing at least one node from the one or more proximal nodes; the plurality of nodes includes a first node and a second node that are not in line-of-sight of each other; at least one third node is in line-of-sight with both the first node and the second node, and operates to convey LiFi message signals from the first node to the second node; the plurality of nodes includes at least one terminal node communicatively coupled to an external network; the at least one terminal node is configured to receive a message sent over the external network and emit a LiFi message signal that includes at least a portion of data conveyed in the message; the external network employs a version of an Ethernet standard for communications; the at least one terminal node is configured to perform operations including determining, based on proximal node data stored by a first terminal node, that a first path from the first terminal node through a first proximal node to a second terminal node includes fewer of the plurality of nodes than a second path from the first terminal node through a second proximal node to the second terminal node, and in response to determining, based on proximal node data stored by a first terminal node, that a first path from the first terminal node through a first proximal node to a second terminal node includes fewer of the plurality of nodes than a second path from the first terminal node through a second proximal node to the second terminal, determining to route the LiFi message signal to the first proximal node instead of the second proximal node; the one or more LiFi discovery signals are emitted in a first frequency band; the LiFi message signal is emitted in a second frequency band that is different than the first frequency band; the second frequency band is an infrared or an ultraviolet frequency band; at least one of the plurality of nodes is located in a subterranean space; and/or at least one of the plurality of nodes is located in a mine space; the operations include receiving a second LiFi message signal at the respective node, determining that the second LiFi message signal includes routing information that indicates a path that does not include the respective node, and in response to determining that the LiFi message signal includes routing information that indicates a path that does not include the respective node, determining not to re-transmit the LiFi message signal; determining at least one of the one or more proximal nodes indicated in the proximal node data to re-transmit the LiFi message signal to includes determining that the LiFi message signal includes routing information that indicates a path that includes the one or more proximal nodes; receiving a LiFi message signal at the respective node includes sensing light that encodes the LiFi message signal and where re-transmitting the LiFi message signal to forward the LiFi message signal to the at least one of the one or more proximal nodes indicated in the proximal node data includes modulating light emitted by the LiFi transceiver to encode the LiFi message signal.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
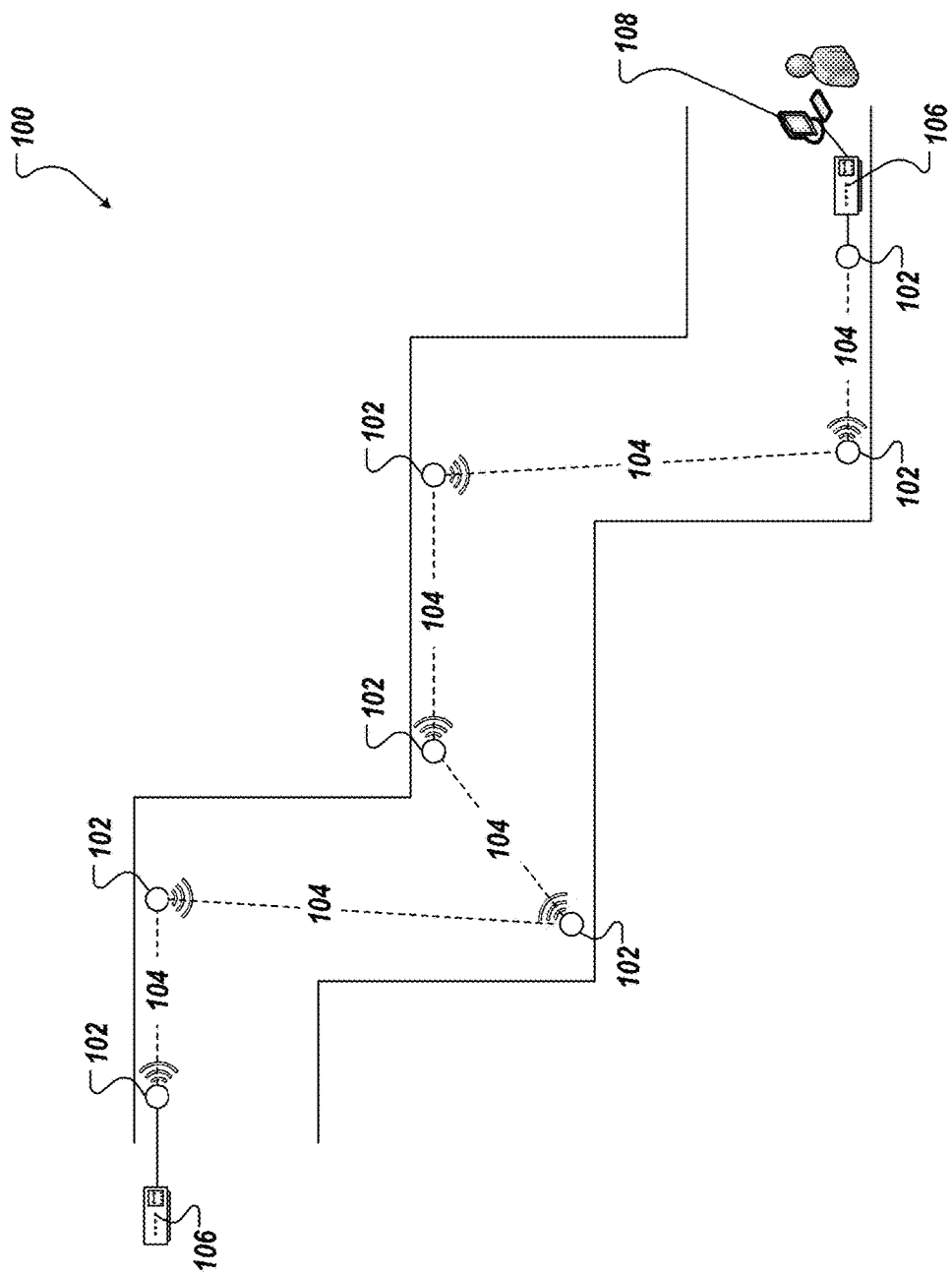
FIG. 1 depicts an example mesh network for light-based communications, according to implementations of the present disclosure.

Implementations of the present disclosure are directed to systems, devices, methods, and computer-readable media for providing an ad hoc mesh network of nodes that employ a light-based transmission protocol, such as a version of light fidelity (LiFi). The mesh network described herein may be employed in environments where traditional wireless (e.g., radio frequency) or wired networks are not viable, such as underwater, in mines or other spaces with radio-frequency opaque obstructions, and so forth. The mesh network may also be employed in environments where a traditional wireless network would interfere with other devices or operations, such as in a medical facility or other contexts where adding radio frequency signals could interfere with other devices or communications.

In some implementations, the mesh network includes multiple nodes that each include at least one (e.g., LiFi) transceiver for sending and/or receiving light-based communications. For example, a node may be a light-emitting diode (LED) bulb. The node can include a modulator that modulates the light emitted from the node to emit a light-based signal from the node. Nodes can each emit a discovery signal identifying themselves to other nodes. On receiving the discovery signal(s) from other node(s), a particular node can analyze the discovery signal(s) to identify those other node(s) that are in proximity to the particular node. In some implementations, the discovery phase can be periodic and/or ongoing to facilitate the addition of nodes to the mesh network or the removal of nodes from the mesh network.

A node can receive a message signal transmitted (or emitted) by another node, by detecting the light modulations emitted by the sending other node to transmit the message signal. The receiving node can forward the message signal to other node(s) that are proximal to the receiving node (e.g., that are in line-of-sight with the receiving node), by emitting the appropriate light modulations to send the message signal. In this way, a message signal can be conveyed from one node to another, from one endpoint of the mesh network to another endpoint of the mesh network. An endpoint, or a terminus node, can be a node that is communicatively coupled to another type of network, also referred to as an external network, such as a wired or wireless network that employs a version of an Ethernet protocol. The external network can also be any other suitable type of wired or wireless network that provides bidirectional communications, unidirectional communications, peer-to-peer communications, and so forth. The network can support communications that use Transmission Control Protocol (TCP), Internet Protocol (IP), and/or other suitable communications protocols, such as protocols that operate at the various layer(s) of the internet protocol suite (e.g., application layer, transport layer, internet layer, and/or link layer) and/or the various layer(s) of the Open Systems Interconnection (OSI) standard (e.g., application layer, presentation layer, session layer, transport layer, network layer, data link layer, and/or physical layer). The network can also be some other type of public switched network (PSN), such as a plain ordinary telephone service (POTS) network. Accordingly, a message signal can be initially received at a first endpoint as a message sent over Ethernet (or some other external network protocol), and relayed from node to node in the mesh network using a light-based communication protocol (e.g., a version of LiFi) until the message is received by a second endpoint that translates the light-based message back into a message in another type of network protocol which can be received, processed, and/or displayed by processes executing on a computing device.

The light-based communication protocol (e.g., LiFi) can use any suitable frequency band of the electromagnetic spectrum to transmit data, including one or more of the infra-red, visible and/or ultra-violet light spectrums. Visible light may refer to light that is visible to the human eye, e.g., electromagnetic radiation in the wavelength range of 380 to 740 nanometers. The light-based communication protocol, such as LiFi, can provide various advantages compared to a traditional radio-frequency WiFi network. For example, LiFi has higher data rates that WiFi, and can achieve 224 gigabits per second (Gbps) compared to WiFi at less than 10 Gbps. A light-based protocol also provides improved security compared to radio frequency wireless communications, particularly in a closed environment. Unlike radio frequency technologies, the transmission of light-based communications ends at the walls, thus preventing a user outside the building or room from gaining unauthorized access to the network. The light-based protocol can also be used in an existing infrastructure. For example, LiFi can be transmitted from commonly used LED bulbs that may already be installed in a space such as a mine. Accordingly, the existing LED bulb installations can be used to establish an ad hoc mesh network for light-based communications, by reconfiguring the already installed lighting infrastructure to also transmit data in addition to providing visible light.

The light-based mesh network, provided by the implementations described herein, can be employed in various environments where a radio-frequency wireless, or wired, network is unsuitable or undesirable. For example, the light-based mesh network can be employed in a mine or other type of (e.g., industrial) facility with many radio-frequency opaque obstructions. Wireless radio-frequency networks in mines face many challenges, particularly given a typical mine topology of non-linear underground tunnels formed through thick layers of rock and earth. The light-based mesh network enables the adoption of connected worker applications for use in such environments. Radio-frequency networks can be difficult to establish and maintain in a mine, given the obstruction of thick, dense rock, and a lack of straight line paths for signal transmission. Wired cabling for wired networks in mines or other environments can be expensive and difficult to maintain, and prone to damage or degradation even in instances where the cabling is armored. Traditional radio-frequency WiFi in a mine exhibits significant signal attenuation due to dense rock material in the mine walls as well as non-uniform tunnel routes. Accordingly, a large number of access points are generally required to deploy a radio-frequency WiFi solution in such a difficult environment. This further creates a large power infrastructure requirement for powering the numerous access points.

Implementations overcome these problems through use of a mesh network that employs light-based communications (e.g., point-to-point light transmissions) to convey messages through convoluted spaces, along lines-of-sight between pairs of nodes. By using already installed light fixtures (e.g., LED bulbs) to create an ad hoc mesh network for communications, implementations use no more power than is already being consumed to provide lighting in the mine. The nodes of the mesh network, such as LED bulbs, can receive power from a power line or run on batteries, providing greater flexibility in power infrastructure compared to a radio-frequency WiFi network that would requires high capacity power lines to be routed throughout the mine. A message can be conveyed along the mesh network, node to node from one endpoint to another endpoint, so long as each node in the mesh network has a line-of-sight view of at least two other nodes (e.g., a sending node and a receiving node).

The light-based mesh network described herein can also be employed for underwater communications, and/or communications in other environments where radio-frequency communications rapidly attenuate over distance or are otherwise unsuitable. Industries such as marine renewables, off-shore operations, marine research, and so forth often need to communicate with devices (e.g., sensors) that are deployed below water. Due to attenuation factors associated with radio-frequency transmissions, acoustic data transmissions are traditionally employed. However, there are concerns that acoustic-based communication may cause confusion, pain, or even injury in marine animals that use acoustic transmission for sensory perception or communication. The light-based mesh network described herein can be used to create an underwater communication network that is less prone to signal attenuation and that avoids creating acoustic interference for marine life. The light-based mesh network described herein can also be employed in other suitable environments.

In some instances, installing a new LiFi network on a site may require substantial investment in LiFi nodes, power cabling, and other infrastructure. To avoid or reduce such costs, implementations provide for the creation of an ad hoc light-based mesh network. Implementations allow the creation of an ad hoc network of light-based communication nodes (e.g., LiFi devices) that would allow chaining of data from a single device with an upstream data connection to an endpoint connected to any node in the network. A node can detect signals transmitted from other units and retransmit the signals down a chain of devices that are pairwise connected through light transmission. Implementations also provide routing and discovery intelligence. The mesh network can be described as ad hoc, given that nodes (e.g., LED bulbs) can be added and/or removed readily to alter the configuration (e.g., topology) of the ad hoc network. For example, an ad hoc network can be created, or an existing network can be modified, by introducing new nodes to the environment including nodes that are powered through a cable and/or by a battery. The ad hoc network can be formed from nodes that provide other functionality in addition to providing the network, such as nodes that provide light in a mine or other environment. The nodes can be easy to add or remove, and can receive power through a wired power connection and/or from a battery. As node(s) (e.g., with LiFi enabled transceivers) are added to or removed from the network, the network can automatically discover the addition or removal of the node(s). In this way, the network can easily be grown or reconfigured, and is also fault tolerant when particular node(s) are lost or are unavailable to the network (e.g., do to explicit removal, LED failure, battery failure, mine tunnel collapses, and so forth).

Implementations provide a light-based network that is a peer-to-peer mesh network. Nodes in the network do not need to be directly connected in order to communicate. Data can be transferred pairwise (e.g., hopped) from node to node until the data reaches a final destination. Within the mesh network, a particular node may be connected to multiple proximal nodes that are within a line-of-sight with the particular node. Further, there may be several routes from node A to node B through the mesh network. Implementations provide advanced routing algorithms that are employed to find the "shortest" (e.g., least number of intermediary nodes) path from node A to node B, to provide the fastest possible speed of transmission along a path between nodes. The fastest, optimal path may be the path that includes the fewest nodes, even if it may not be the shortest path according to the distance between the endpoints.

A particular node may include one or more light transceivers, or one or more light receivers (e.g., sensors) and one or more light transmitters (e.g., emitters). In some examples, a node may have receiver(s) and transmitter(s) that are positioned such that the receiver(s) do not interfere with and/or detect the light that is transmitted by the transmitters.

In some implementations, a discovery phase may be performed periodically (and/or on an ongoing basis) to enable nodes to discover the presence of one another. The discovery phase can employ discovery signals that are transmitted from each node to advertise its presence to other nodes. In some implementations, the discovery phase employs a different frequency band than that used for sending messages within the network. For example, the discovery phase can use discovery messages that are transmitted in the visible light frequency band, whereas the messages can be transmitted using frequencies outside the range of visible light, such as the infrared or ultraviolet frequency bands. In another example, the discovery phase can use discovery messages that are transmitted in the infrared or ultraviolet frequency bands, whereas the messages can be transmitted using frequencies inside the range of visible light. Accordingly, the nodes can be used to send messages even when they are not being used to light a space with visible light.

During the discovery phase, the nodes can transmit discovery signals that identify the transmitting nodes, such as through use of a node identifier (ID) included in the discovery signal. In some implementations, each node can detect other nodes that are in proximity (e.g., line-of-sight) based on receiving the discovery signals sent from the other nodes, and the node can store proximal node data that lists the node IDs of those nodes detected. The node can then use the proximal node data for real time routing of messages to one or more of the proximal nodes. In some instances, routing may include dynamic route optimization to determine the shortest path, as described further herein.

FIG. 1 depicts an example mesh network for light-based communications, according to implementations of the present disclosure. In an environment 100, such as a mine as in the example shown, a plurality of nodes 102 may be positioned such that each non-terminal node is in line-of-sight with at least two other nodes. In some examples, the nodes 102 can be LED bulbs that have been previously installed for lighting. In some instances, one or more of the nodes 102 can be in a subterranean (e.g., underground) environment, such as in a mine space. Each node can include a controller that modulates the light emitted from the node, to enable the node to send signals 104 to one or more other nodes. In some implementations, each endpoint node can be communicatively coupled to a network connection 106, such as a hub, router, switch, or other network appliance that provides a connection to an external network (e.g., Ethernet). A message 104 can be received at a first endpoint node from an external network, by way of the connection 106, and conveyed from node to node along the mesh network until it reaches a second endpoint node. The second endpoint node can be connected to a different external network (e.g., Ethernet), which may connect to a user device 108. In this manner, the light-based mesh network can provide a communications route to connect two separate external networks that may not be readily connectable otherwise. The user device 108 can be any suitable type of computing device, such as a smartphone, laptop computer, tablet computer, desktop computer, and so forth. The user device 108 can also be any other suitable type of computing device. In some examples, the user device 108 is a wearable computing device such as a device with the form factor of a watch, wristband, glasses, headset, visor, augmented reality visor, and/or other suitable types of wearable devices. In some examples, the user device 108 is a smart helmet that can provide head protection, lighting, and/or communications services, as well as computation and data storage capabilities.

Figure 2:
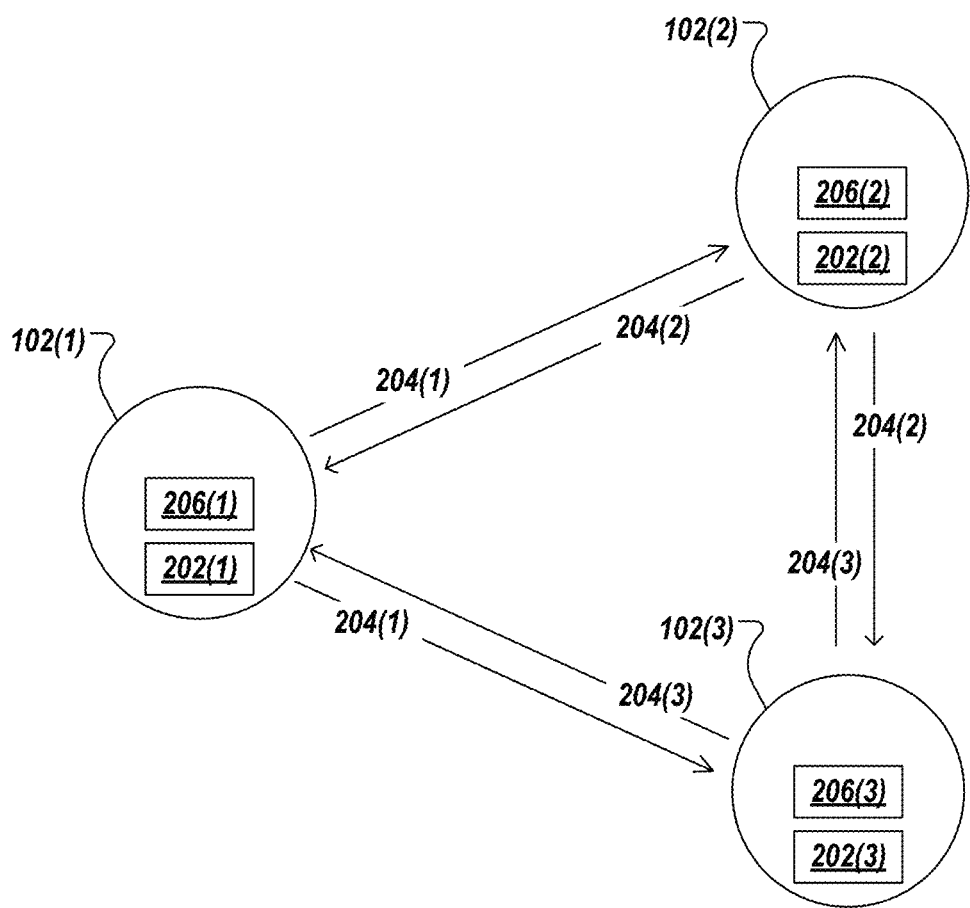
FIG. 2 depicts an example schematic illustrating discovery among nodes in the light-based mesh network, according to implementations of the present disclosure.

FIG. 2 depicts an example schematic illustrating discovery among nodes 102 in the light-based mesh network, according to implementations of the present disclosure. As shown in the example of FIG. 2, each node 102 can include at least one light transceiver 202 for sending and receiving light-based communications. Alternatively, a node can include separate receiver(s) and transmitter(s). In some implementations, a node 102 can also include a module 206. The module 206 can include local data storage (e.g., for storing proximal node data), and a controller to modulate the transmitter (or transceiver) to emit signals. The module 206 can also include a processor that executes software to determine how to route incoming messages to other nodes, based on the proximal node data and/or routing information included in the messages.

Each node 102 can transmit discovery signal(s) 204 that are received by other node(s) 102 in proximity (e.g., line-of-sight) to the sending node 102. The receiving node(s) 102 can extract the sending node's node ID from the discovery signal 204, and add that node ID to the proximal node data stored locally to indicate that the sending node is proximal to the receiving node, such that the nodes can communicate with one another using light-based signaling.

Figure 3:
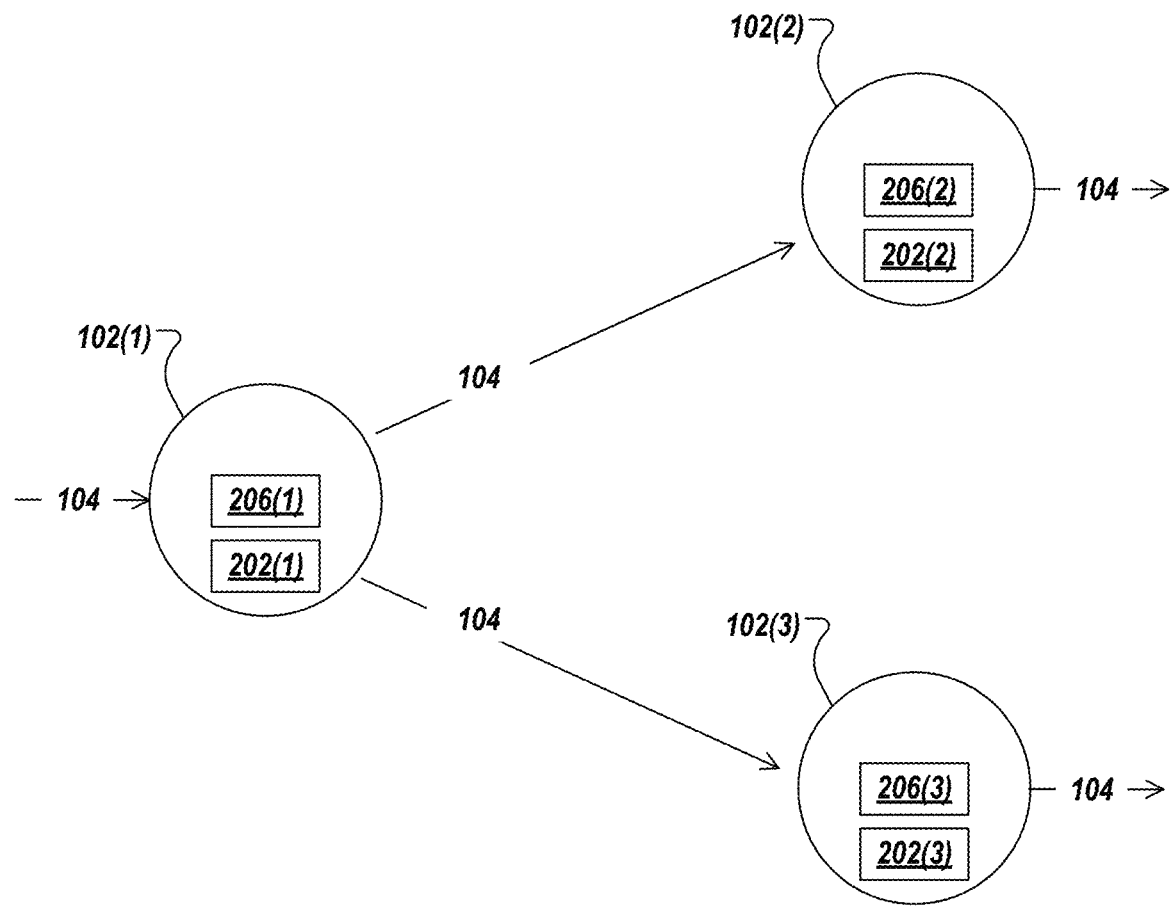
FIG. 3 depicts an example schematic illustrating routing in the light-based mesh network, according to implementations of the present disclosure.

FIG. 3 depicts an example schematic illustrating routing in the light-based mesh network, according to implementations of the present disclosure. As shown in the example of FIG. 3, a message signal 104 can be received at a node 102(1), which stores proximal node data identifying nodes as available recipients. The node 102(1) can re-transmit the message signal 104 to nodes 102(2) and/or 102(3), and possibly to other node(s), that are proximal to node 102(1). The receiving node(s) can then re-transmit the message signal 104, and so on until the message signal 104 reaches an endpoint (terminal node).

Figure 4:
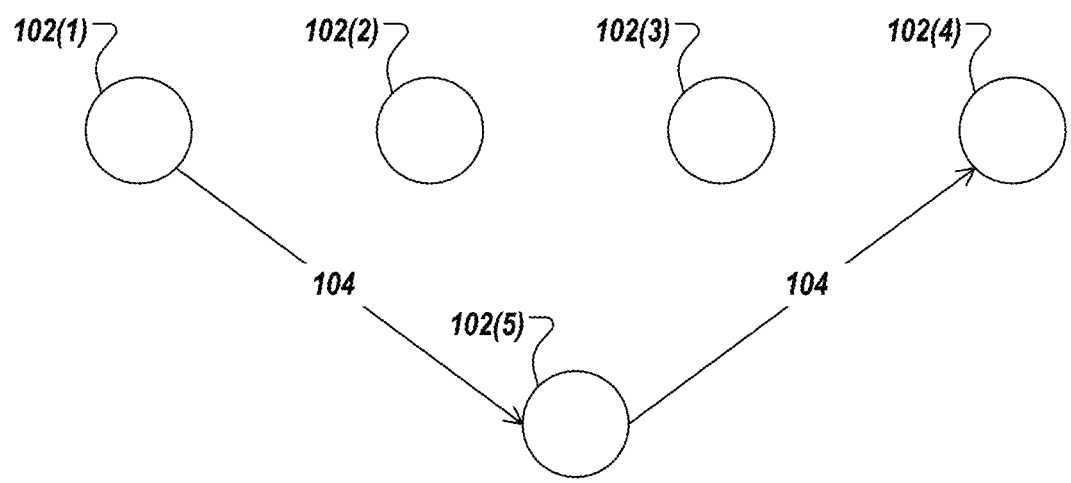
FIG. 4 depicts an example schematic illustrating optimized routing between nodes in the light-based mesh network, according to implementations of the present disclosure.

FIG. 4 depicts an example schematic illustrating optimized routing between nodes 102 in the light-based mesh network, according to implementations of the present disclosure. As shown in this example, nodes 102(1), 102(2), 102(3), 102(4), and 102(5) can be present in a mesh network. A node 102(1) can be proximal to nodes 102(2) and 102(5), and a node 102(4) can be proximal to nodes 102(3) and 102(5). Nodes 102(2) and 102(3) can be proximal to each other, such that a viable route for transmission exists from node 102(1) to node 102(2) to node 102(3) to node 102(4). However, because node 102(5) is proximal to both nodes 102(1) and 102(4), the system may select to use the shorter (fewer nodes) and more optimal path 102(1)-102(5)-102(4) instead of the longer (more nodes) available path 102(1)-102(2)-102(3)-102(4).

In some implementations, optimization can be performed by an overall network controller that is included in an endpoint node or in a device coupled to the endpoint node. The network controller can receive discovery information conveyed along the network, and keep track of the current topology of the mesh network (e.g., indicating which nodes are currently able to communicate with which other nodes). The network controller can determine an optimal route for a particular message to reach a particular endpoint, based on the current topology, and the network controller can insert the routing information into the message. Each node receiving the message can retrieve the routing information and use it to determine the next node(s) to send the message to. In some examples, a transmitted message can be received by a node that is not in the optimal route that is indicated by the routing information in the message. In such instances, the receiving node may not re-transmit the message.

Figure 5:
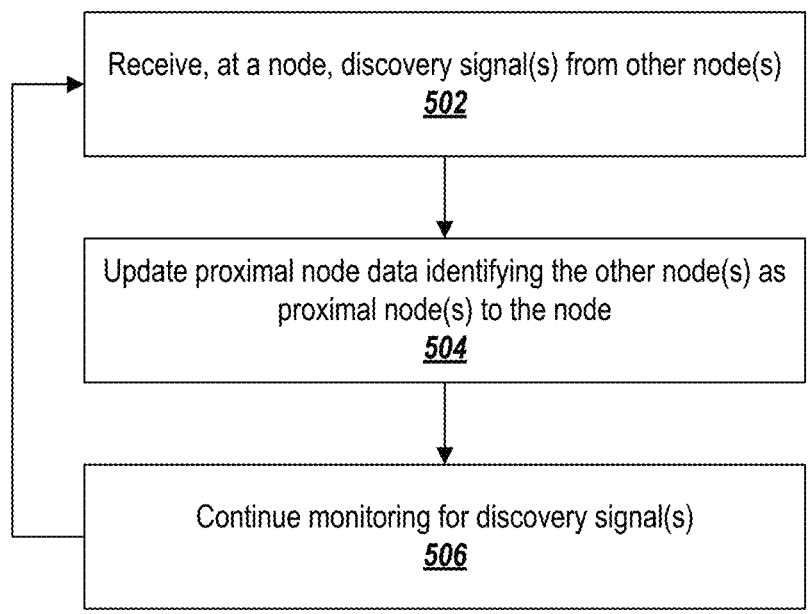
FIG. 5 depicts a flow diagram of an example process for discovery among nodes in the light-based mesh network, according to implementations of the present disclosure.

FIG. 5 depicts a flow diagram of an example process for discovery among nodes in the light-based mesh network, according to implementations of the present disclosure. Operations of the process can be performed by software executing on one or more of the nodes 102, the network appliances 106, the user device 108, or elsewhere. For example, the operations of the example process shown in FIG. 5 may be performed by each respective node of a plurality of nodes, where each respective nodes includes at least one LiFi transceiver.

At a node 102, discovery signal(s) are received (502) from other node(s) 102. Particularly, one or more LiFi discovery signals may be received by a respective node, each LiFi discovery signal sent from a respective proximal node and conveying a node identifier (ID) of the respective proximal node. For example, the node 102(1) may receive, from the node 102(2), a first discovery signal that includes the node identifier "102(2)" and may receive, from the node 102(3), a second discover signal that includes the node identifier "102(3)."

The receiving node 102 can update (504) its proximal node data to identify the other node(s) 102 as proximal node(s) to the receiving node, and thus available for peer-to-peer communication with the receiving node 102. Particularly, in response to receiving the one or more LiFi discovery signals, the respective node may store proximal node data that includes the respective node ID of each of the one or more proximal nodes to indicate that the one or more proximal nodes are available for LiFi communication with the respective node. For example, the node 102(1) may store proximal node data that includes the respective node IDs of "102(2)" and "102(3)" to indicate that the proximal nodes 102(2) and 102(3) are available for peer-to-peer communication with the node 102(1). In some implementations, the proximal node data is stored locally on the respective node. For example, the node 102(1) may locally store proximal node data that includes the respective node IDs of "102(2)" and "102(3)" to indicate that the proximal nodes 102(2) and 102(3) are available for peer-to-peer communication with node 102(1).

The receiving node 102 can continue monitoring (506) for discovery signal(s) periodically and/or on an ongoing basis, to enable dynamic reconfiguration of the network with the addition and/or removal of nodes.

In some implementations, in the process shown in FIG. 5 the plurality of nodes includes at least one LED bulb. For example, each node may include one, two, five, or some other number of LED bulbs. In some implementations, in the process shown in FIG. 5, respective nodes may periodically update the proximal node data based on subsequent receiving of LiFi discovery signals. For example, the node 102(1) may receive a discovery signal from a new node that indicates a node ID of "102(4)" and, in response, add the node ID "102(4)" to the proximal node data.

In some implementations, periodically updating the proximal node data includes one or more of adding at least one node to the one or more proximal nodes and removing at least one node from the one or more proximal nodes. For example, the node 102(1) may not receive a discovery signal from node 102(2) for more than a one, two, five minutes, or some other predetermined amount of time and, in response, remove the node ID 102(2) from the proximal node data as the lack of a receiving a discovery signal may indicate that the node 102(2) is no longer available for communication.

In some implementations, the plurality of nodes includes a first node and a second node that are not in line-of-sight of each other and at least one third node that is in line-of-sight with both the first node and the second node, and operates to convey LiFi message signals from the first node to the second node. For example, the node 102(2) and the node 102(3) may not be in line-of-sight of one another but both may be in line-of-sight of node 102(1), so node 102(1) may convey messages between the nodes 102(2) and 102(3) by receiving LiFi message signals from one node and then re-transmitting the LiFi message signals so that the other node receives the LiFi message signals.

In some implementations, the plurality of nodes includes at least one terminal node communicatively coupled to an external network and the at least one terminal node is configured to receive a message sent over the external network and emit a LiFi message signal that includes at least a portion of data conveyed in the message. For example, the node 102(1) may be a terminal node that is coupled to the network appliance 106. In some implementations, the external network employs a version of an Ethernet standard for communications. For example, the network appliance 106 may use the Institute of Electrical and Electronics Engineers (IEEE) 802.3 standard.

In some implementations, the at least one terminal node is configured to perform operations that include determining, based on proximal node data stored by a first terminal node, that a first path from the first terminal node through a first proximal node to a second terminal node includes fewer of the plurality of nodes than a second path from the first terminal node through a second proximal node to the second terminal node and in response to determining, based on proximal node data stored by a first terminal node, that a first path from the first terminal node through a first proximal node to a second terminal node includes fewer of the plurality of nodes than a second path from the first terminal node through a second proximal node to the second terminal, determining to route the LiFi message signal to the first proximal node instead of the second proximal node. For example, the node 102(1) may receive a LiFi message signal to be routed to node 102(4), determine a first path from node 102(1) to node 102(4) through node 102(5), determine a first path from node 102(1) to node 102(4) through node 102(2), determine that the first path includes three nodes which is fewer than the four nodes included in the second path, and, in response, determine to route the LiFi message signal to node 102(4) through node 102(5).

In some implementations, the one or more LiFi discovery signals are emitted in a first frequency band and the LiFi message signal is emitted in a second frequency band that is different than the first frequency band. For example, the second frequency band may be an infrared or an ultraviolet frequency band. In some implementations, at least one of the plurality of nodes is located in a subterranean space or a mine space.

Figure 6:
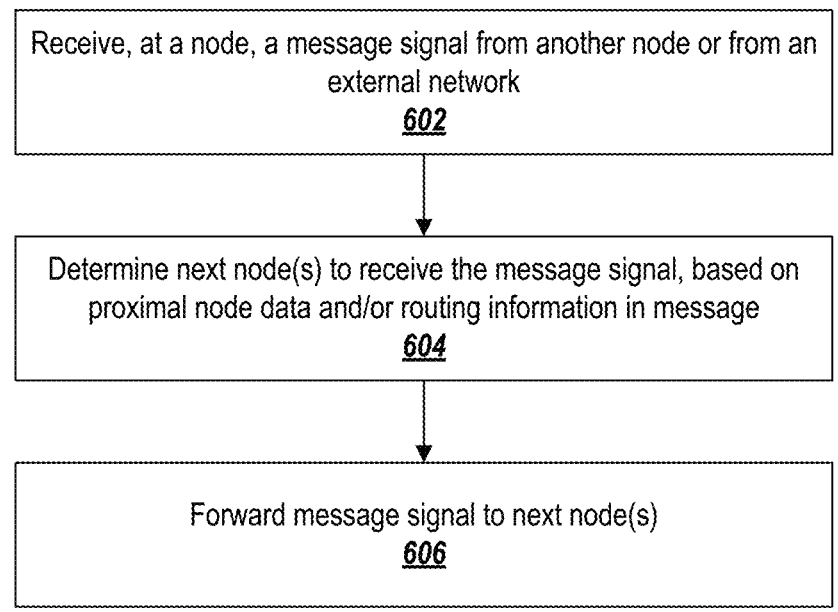
FIG. 6 depicts a flow diagram of an example process for routing in the light-based mesh network, according to implementations of the present disclosure.

FIG. 6 depicts a flow diagram of an example process for routing in the light-based mesh network, according to implementations of the present disclosure. Operations of the process can be performed by software executing on one or more of the nodes 102, the network appliances 106, the user device 108, or elsewhere.

At a node 102, a message signal is received (602) from another node 102 or from an external network. One or more next nodes 102 are determined (604) to receive the message signal, based on the proximal node data and/or routing information included in the message. The receiving node 102 can re-transmit the message signal (606), thus forwarding the message signal to the next node(s).

In some implementations, the process depicted in FIG. 6 includes operations that include receiving a second LiFi message signal at the respective node, determining that the second LiFi message signal includes routing information that indicates a path that does not include the respective node, and in response to determining that the LiFi message signal includes routing information that indicates a path that does not include the respective node, determining not to re-transmit the LiFi message signal. For example, the node 102(2) may receive a LiFi message signal that includes routing information that indicates a path from node 102(1) to node 102(5) to node 102(4), determine that the path does not include the node 102(2), and, in response, determine not to re-transmit the LiFi message signal.

In some implementations, determining at least one of the one or more proximal nodes indicated in the proximal node data to re-transmit the LiFi message signal to includes determining that the LiFi message signal includes routing information that indicates a path that includes the one or more proximal nodes. For example, the node 102(5) may determine that a received LiFi message signal includes routing information that specifies the node 102(4) which is stored as a proximate node in the proximal node data stored by the node 102(5) and, in response, re-transmit the LiFi message signal so that the node 102(4) receives the signal.

In some implementations, receiving a LiFi message signal at the respective node includes sensing light that encodes the LiFi message signal and re-transmitting the LiFi message signal to forward the LiFi message signal to the at least one of the one or more proximal nodes indicated in the proximal node data includes modulating light emitted by the LiFi transceiver to encode the LiFi message signal. For example, the node 102(5) may detect modulations in when visible light is transmitted by the node 102(1) using a photodetector of the node 102(5), decode the LiFi message signal from the modulations, and then re-transmit the LiFi message signal by modulating when light is transmitted by a LED bulb of the node 102(5). In another example, the node 102(5) may detect modulations in wavelengths of infrared light that is transmitted by the node 102(1) using a photodetector of the node 102(5), decode the LiFi message signal from the modulations in wavelengths, and then re-transmit the LiFi message signal by modulating wavelengths of infrared light that is transmitted by a LED bulb of the node 102(5).

Figure 7:
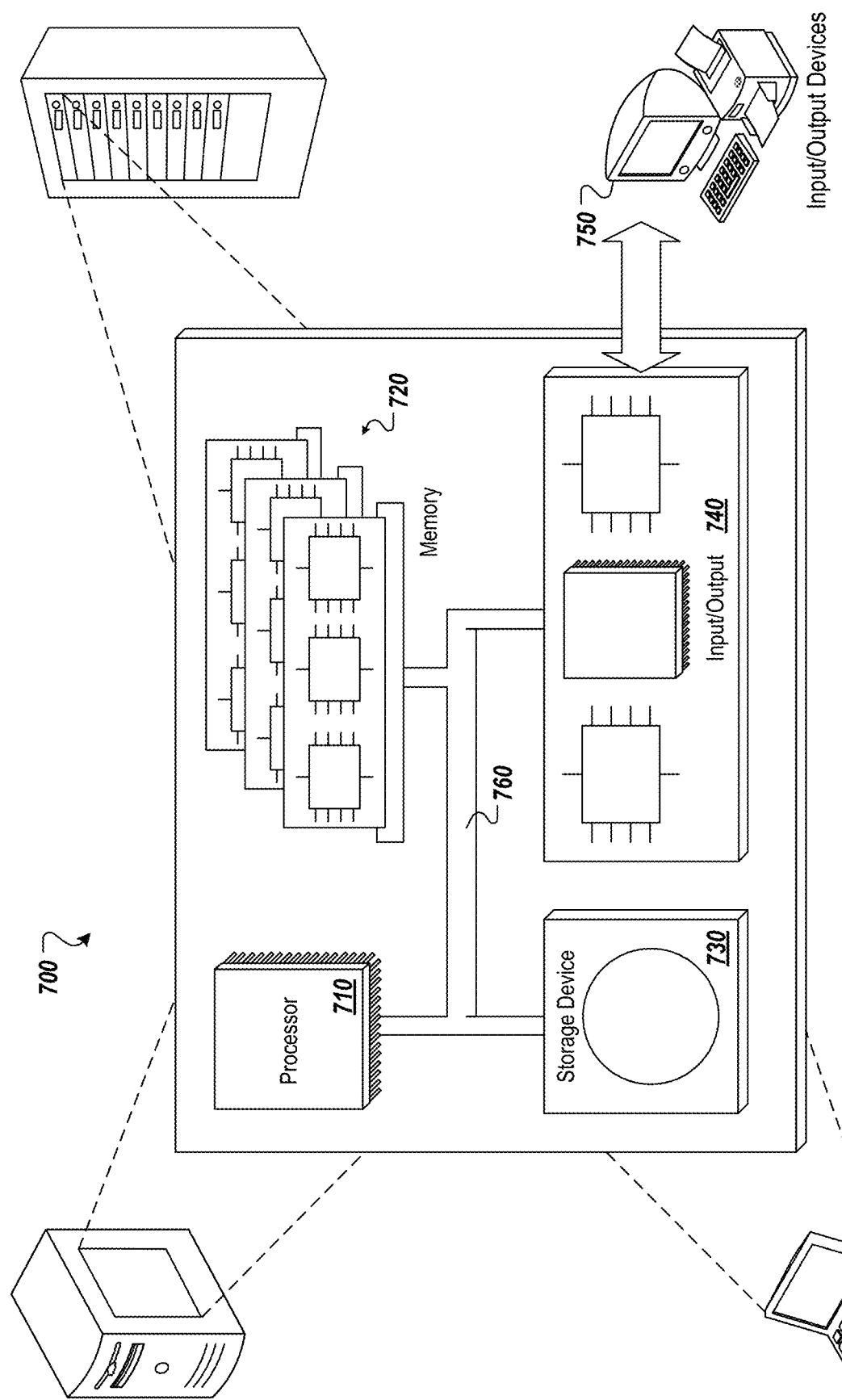
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the nodes 102, the network appliances 106, the user device 108, and/or other computing device(s) or system(s) described herein. The system 700 may include one or more processors 710, a memory 720, one or more storage devices 730, and one or more input/output (I/O) devices 750 controllable through one or more I/O interfaces 740. The various components 710, 720, 730, 740, or 750 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system for communicating messages, the system comprising:
   a plurality of nodes each including at least one light fidelity (LiFi) transceiver that emits in both a visible frequency band and an infrared or ultraviolet frequency, each respective node configured to perform operations including:
      receiving, at the respective node, one or more LiFi discovery signals, each LiFi discovery signal sent from a respective proximal node and conveying a node identifier (ID) of the respective proximal node, wherein the one or more LiFi discovery signals are emitted in the visible frequency band while the respective proximal node is being used to light a space with visible light;
      in response to receiving the one or more LiFi discovery signals, storing proximal node data that includes the respective node ID of each of the one or more proximal nodes to indicate that the one or more proximal nodes are available for LiFi communication with the respective node; and
      receiving a LiFi message signal at the respective node and, in response, determining at least one of the one or more proximal nodes indicated in the proximal node data to re-transmit the LiFi message signal to, and re-transmitting the LiFi message signal to forward the LiFi message signal to the at least one of the one or more proximal nodes indicated in the proximal node data, wherein the LiFi message signal is emitted in an infrared or ultraviolet frequency band regardless of whether the respective node is being used to light the space with visible light,
   wherein the plurality of nodes includes at least one terminal node this is communicatively coupled to an external network that employs a version of an Ethernet standard for communications;
   wherein the at least one terminal node is configured to receive a message sent over the external network and emit a LiFi message signal that includes at least a portion of data conveyed in the message; and
   wherein the at least one terminal node is configured to perform operations including:
      determining, based on proximal node data stored by a first terminal node, that a first path from the first terminal node through a first proximal node to a second terminal node includes fewer of the plurality of nodes than a second path from the first terminal node through a second proximal node to the second terminal node; and
      in response to determining, based on proximal node data stored by a first terminal node, that a first path from the first terminal node through a first proximal node to a second terminal node includes fewer of the plurality of nodes than a second path from the first terminal node through a second proximal node to the second terminal, determining to route the LiFi message signal to the first proximal node instead of the second proximal node and inserting routing information into the LiFi message signal that identifies a third node that is known to the at least one terminal node as proximal to the first proximal node.

2. The system of claim 1, wherein the plurality of nodes includes at least one light emitting diode (LED) bulb.

3. The system of claim 1, wherein the proximal node data is stored locally on the respective node.

4. The system of claim 1, the operations further comprising:
   periodically updating the proximal node data based on subsequent receiving of LiFi discovery signals.

5. The system of claim 4, wherein periodically updating the proximal node data includes one or more of:
   adding at least one node to the one or more proximal nodes; and
   removing at least one node from the one or more proximal nodes.

6. The system of claim 1, wherein:
   the plurality of nodes includes a first node and a second node that are not in line-of-sight of each other; and
   at least one third node is in line-of-sight with both the first node and the second node, and operates to convey LiFi message signals from the first node to the second node.

7. The system of claim 1, wherein the external network employs a version of an Ethernet standard for communications.

8. The system of claim 1, wherein at least one of the plurality of nodes is located in a subterranean space.

9. The system of claim 1, wherein at least one of the plurality of nodes is located in a mine space.

10. The system of claim 1, wherein the operations comprise:
receiving a second LiFi message signal at the respective node;
determining that the second LiFi message signal includes routing information that indicates a path that does not include the respective node; and
in response to determining that the LiFi message signal includes routing information that indicates a path that does not include the respective node, determining not to re-transmit the LiFi message signal.

11. The system of claim 1, wherein determining at least one of the one or more proximal nodes indicated in the proximal node data to re-transmit the LiFi message signal to comprises:
determining that the LiFi message signal includes routing information that indicates a path that includes the one or more proximal nodes.

12. The system of claim 1, wherein receiving a LiFi message signal at the respective node comprises sensing light that encodes the LiFi message signal and wherein re-transmitting the LiFi message signal to forward the LiFi message signal to the at least one of the one or more proximal nodes indicated in the proximal node data comprises modulating light emitted by the LiFi transceiver to encode the LiFi message signal.

13. A computer-implemented method comprising:
receiving, at a respective node of a plurality of nodes that each include at least one light fidelity (LiFi) transceiver that emits in both a visible frequency band and an infrared or ultraviolet frequency, one or more LiFi discovery signals, each LiFi discovery signal sent from a respective proximal node and conveying a node identifier (ID) of the respective proximal node, wherein the one or more LiFi discovery signals are emitted in the visible frequency band while the respective proximal node is being used to light a space with visible light;
in response to receiving the one or more LiFi discovery signals, storing proximal node data that includes the respective node ID of each of the one or more proximal nodes to indicate that the one or more proximal nodes are available for LiFi communication with the respective node; and
receiving a LiFi message signal at the respective node and, in response, determining at least one of the one or more proximal nodes indicated in the proximal node data to re-transmit the LiFi message signal to, and re-transmitting the LiFi message signal to forward the LiFi message signal to the at least one of the one or more proximal nodes indicated in the proximal node data, wherein the LiFi message signal is emitted in the infrared or ultraviolet frequency band regardless of whether the respective node is being used to light the space with visible light,
wherein the plurality of nodes includes at least one terminal node this is communicatively coupled to an external network that employs a version of an Ethernet standard for communications;
wherein the at least one terminal node is configured to receive a message sent over the external network and emit a LiFi message signal that includes at least a portion of data conveyed in the message; and
wherein the at least one terminal node is configured to perform operations including:
determining, based on proximal node data stored by a first terminal node, that a first path from the first terminal node through a first proximal node to a second terminal node includes fewer of the plurality of nodes than a second path from the first terminal node through a second proximal node to the second terminal node; and
in response to determining, based on proximal node data stored by a first terminal node, that a first path from the first terminal node through a first proximal node to a second terminal node includes fewer of the plurality of nodes than a second path from the first terminal node through a second proximal node to the second terminal, determining to route the LiFi message signal to the first proximal node instead of the second proximal node and inserting routing information into the LiFi message signal that identifies a third node that is known to the at least one terminal node as proximal to the first proximal node.

14. The method of claim 13, comprising:
receiving a second LiFi message signal at the respective node;
determining that the second LiFi message signal includes routing information that indicates a path that does not include the respective node; and
in response to determining that the LiFi message signal includes routing information that indicates a path that does not include the respective node, determining not to re-transmit the LiFi message signal.

15. The method of claim 13, wherein the plurality of nodes includes at least one light emitting diode (LED) bulb.

16. The method of claim 13, wherein the proximal node data is stored locally on the respective node.

17. The method of claim 13, further comprising:
periodically updating the proximal node data based on subsequent receiving of LiFi discovery signals.

18. The method of claim 17, wherein periodically updating the proximal node data includes one or more of:
adding at least one node to the one or more proximal nodes; and
removing at least one node from the one or more proximal nodes.

19. The method of claim 13, wherein:
the plurality of nodes includes a first node and a second node that are not in line-of-sight of each other; and
at least one third node is in line-of-sight with both the first node and the second node, and operates to convey LiFi message signals from the first node to the second node.

20. A non-transitory computer-readable medium storing software comprising instructions executable by one or more processors which, upon such execution, cause the one or more processors to perform operations comprising:
receiving, at a respective node of a plurality of nodes that each include at least one light fidelity (LiFi) transceiver that emits in both a visible frequency band and an infrared or ultraviolet frequency, one or more LiFi discovery signals, each LiFi discovery signal sent from a respective proximal node and conveying a node identifier (ID) of the respective proximal node, wherein the one or more LiFi discovery signals are emitted in the visible frequency band while the respective proximal node is being used to light a space with visible light;
in response to receiving the one or more LiFi discovery signals, storing proximal node data that includes the respective node ID of each of the one or more proximal nodes to indicate that the one or more proximal nodes are available for LiFi communication with the respective node; and receiving a LiFi message signal at the respective node and, in response, determining at least one of the one or more proximal nodes indicated in the proximal node data to re-transmit the LiFi message signal to, and re-transmitting the LiFi message signal to forward the LiFi message signal to the at least one of the one or more proximal nodes indicated in the proximal node data, wherein the LiFi message signal is emitted in the infrared or ultraviolet frequency band regardless of whether the respective node is being used to light the space with visible light, wherein the plurality of nodes includes at least one terminal node this is communicatively coupled to an external network that employs a version of an Ethernet standard for communications;

wherein the at least one terminal node is configured to receive a message sent over the external network and emit a LiFi message signal that includes at least a portion of data conveyed in the message; and wherein the at least one terminal node is configured to perform operations including:

determining, based on proximal node data stored by a first terminal node, that a first path from the first terminal node through a first proximal node to a second terminal node includes fewer of the plurality of nodes than a second path from the first terminal node through a second proximal node to the second terminal node; and in response to determining, based on proximal node data stored by a first terminal node, that a first path from the first terminal node through a first proximal node to a second terminal node includes fewer of the plurality of nodes than a second path from the first terminal node through a second proximal node to the second terminal, determining to route the LiFi message signal to the first proximal node instead of the second proximal node and inserting routing information into the LiFi message signal that identifies a third node that is known to the at least one terminal node as proximal to the first proximal node.

* * * * *